United States Patent
Collver

(10) Patent No.: US 12,493,617 B2
(45) Date of Patent: Dec. 9, 2025

(54) MODELING INDIVIDUAL INTERFACES FOR EXECUTING INTERFACE QUERIES OVER MULTIPLE INTERFACES

(71) Applicant: Amazon Technologies, Inc., Seattle, WA (US)

(72) Inventor: Aaron Collver, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 228 days.

(21) Appl. No.: 17/489,501

(22) Filed: Sep. 29, 2021

(65) Prior Publication Data

US 2023/0107925 A1 Apr. 6, 2023

(51) Int. Cl.
*G06F 16/2453* (2019.01)
*G06F 9/54* (2006.01)

(52) U.S. Cl.
CPC .......... *G06F 16/24545* (2019.01); *G06F 9/54* (2013.01); *G06F 16/24547* (2019.01)

(58) Field of Classification Search
CPC . G06F 16/24545; G06F 16/24547; G06F 9/54
See application file for complete search history.

(56) References Cited

U.S. PATENT DOCUMENTS

| | | | |
|---|---|---|---|
| 10,558,671 B2 | 2/2020 | Tamjidi et al. | |
| 10,585,771 B1 * | 3/2020 | Gheva ................ | G06F 11/3409 |
| 10,776,189 B2 * | 9/2020 | Bucchi ................. | G06F 16/951 |
| 11,323,327 B1 * | 5/2022 | Chitalia .............. | H04L 41/0893 |
| 11,467,887 B1 * | 10/2022 | Caudill .................... | G06F 9/54 |
| 2002/0154755 A1 | 10/2002 | Gourraud ............ | H04Q 3/0029 379/219 |
| 2003/0212904 A1 * | 11/2003 | Randle ................... | G06Q 20/04 705/64 |
| 2009/0228253 A1 * | 9/2009 | Tolone .................. | G06Q 10/06 703/6 |
| 2014/0258321 A1 * | 9/2014 | Liu ................... | G06F 16/24522 707/763 |
| 2015/0261817 A1 * | 9/2015 | Harris ............... | G06F 16/24542 707/718 |
| 2020/0097559 A1 | 3/2020 | Wittern et al. | |
| 2020/0106658 A1 | 4/2020 | A et al. | |
| 2020/0380415 A1 * | 12/2020 | Siracusa ................... | G06F 8/35 |
| 2021/0042276 A1 * | 2/2021 | Van Syckel ......... | G06F 21/6218 |
| 2021/0218773 A1 | 7/2021 | Prakash et al. | |
| 2023/0094373 A1 * | 3/2023 | Muralidharan ....... | G06F 11/327 714/38.1 |

* cited by examiner

*Primary Examiner* — Vaishali Shah
(74) *Attorney, Agent, or Firm* — S. Scott Foster; Kowert, Hood, Munyon, Rankin & Goetzel, P.C.

(57) ABSTRACT

Interface models may be used to execute interface queries over multiple interfaces. A query may be received at a service that is specified according to an interface query language. A plan to perform the query may be generated from an application of interface models for different components of the service to determine behavior for invoking different interfaces. The different interfaces are then invoked according to the plan in order to perform the query. A result to the query is determined based on responses received from the different interfaces and returned.

20 Claims, 9 Drawing Sheets

MODELING INDIVIDUAL INTERFACES FOR EXECUTING INTERFACE QUERIES OVER MULTIPLE INTERFACES

BACKGROUND

Complex applications may rely upon many different underlying components, which may have different respective programmatic interfaces for invoking component operations. User interfaces of such applications may have to coordinate the performance of different programmatic interface requests across the different components in order to provide different user interface features. Views, for example, of data provided by different components may be generated by requesting and combining data received via different programmatic interface requests.

Figure 1:
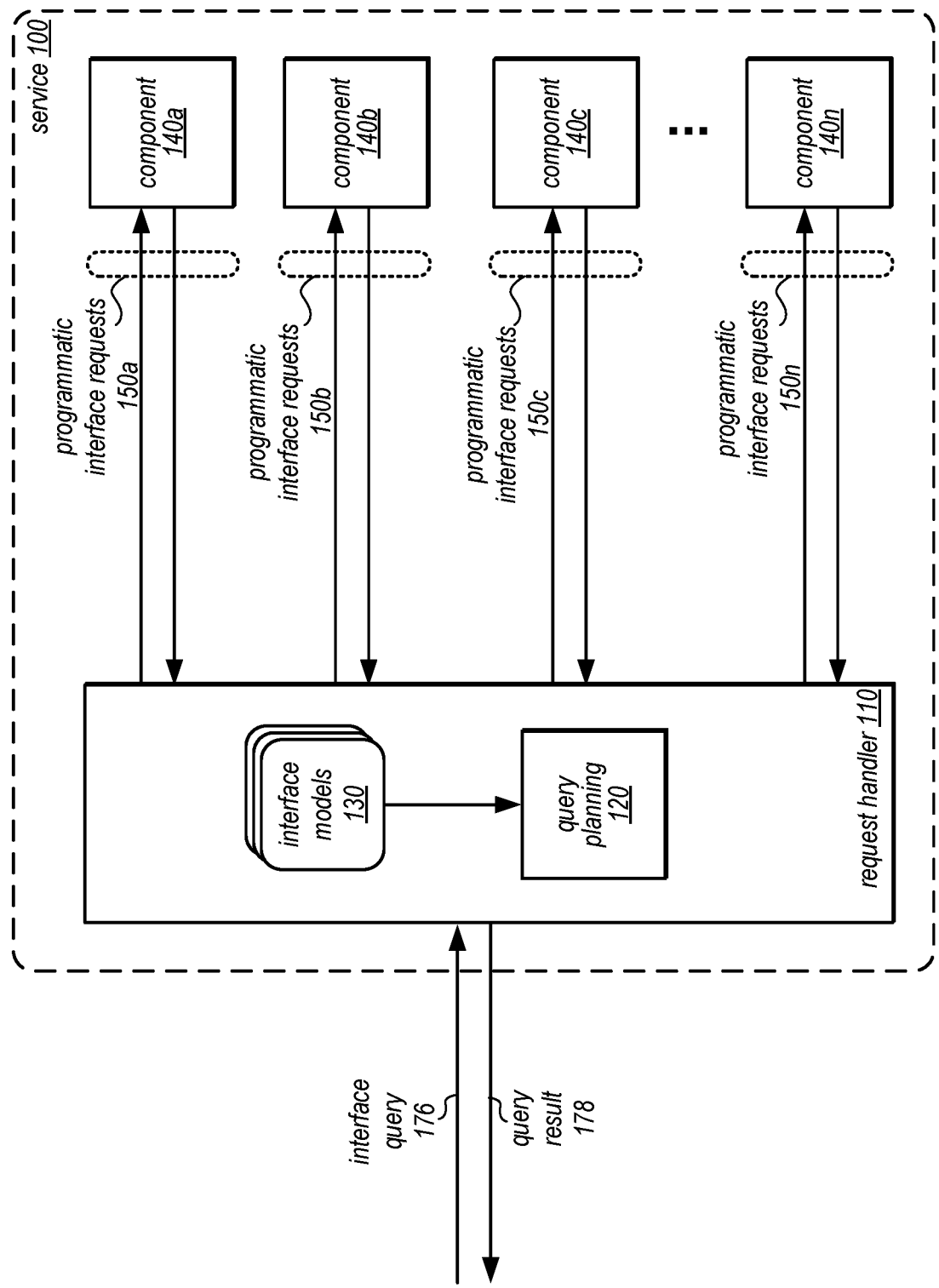
FIG. 1 is a block diagram illustrating modeling individual interfaces for executing interface queries over multiple interfaces, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for modeling individual interfaces for executing interface queries over multiple interfaces are described. Different provider network services, such as an application development, build, delivery, and deployment system as discussed in detail below, may bring together many different components that users of the service may utilize to perform various operations. For example, in the example application development service discussed below, different development tools may be used frequently (e.g., daily) by different users to build, deploy, and operation applications. In order to fully integrate these components, different views may utilize information obtained from the different components, to provide a rich user interface experience, including features like interactive pagination, multi-column sort, and filter on information obtained from the different components.

For services and other distributed applications, different entities, teams, owners, or developers may be responsible for maintaining the interface for those components independently. While such a scenario allows for the different components to develop and advance in quality and/or capability at an individual pace, changes to the interfaces of these components that often accompany these developments may be difficult to integrate. For example, users accessing the service through an interface may experience less performant interfaces that cannot easily incorporate new changes to components. Instead of less performant solutions, such as utilizing code executed in a user's web-browser to chain, join, and/or aggregate different programmatic interface calls to the different components which may be limited according to the performance capabilities of a web-browser to execute complex user interface actions, techniques that implement modeling individual interfaces for executing interface queries over multiple interfaces can allow for a service-side implementation (e.g., at a web-server) that can better scale and perform complex user interface actions than the client-side (e.g., at a user's web browser) techniques noted above.

For example, as discussed in detail below, programmatic interface models may be used in various embodiments to describe interface shapes (e.g., the expected input and output parameters of a programmatic interface, such as an Application Programming Interface (API) call). The programmatic interface models may be protocol agnostic, supporting the use of single-request style interactions using, for example a Representational State Transfer (REST) API call, and also other protocols that support a service-side implementation of multiple interactions, such as interface queries specified according to an interface query language, such as GraphQL, which allows a client to a request with a structure and desired data to be returned from one or multiple programmatic interfaces that would be used to supply the data.

FIG. 1 is a block diagram illustrating modeling individual interfaces for executing interface queries over multiple interfaces, according to some embodiments. Service 100 may be a distributed application operating in a public network (e.g., a provider network service), a private network (e.g., implementing an on-premise solution for various internal operations of an organization), or other style of distributed application over which different components, such as components 140a, 140b, 140c, and 140n, may implement separate programmatic interfaces (e.g., different APIs). Service 100 may implement a request handler 110 that utilizes interface models 130 in order to perform query planning 120 to execute queries, such as interface query 176.

In various embodiments, interface query 176 may be specified according to an interface query language, such as GraphQL, which may a utilize a format, such as Javascript Object Notation (JSON) to specify the data and structure of the data to be retrieved from components 140 via programmatic interface requests 150. Request handler 110 may take interface models 130 to determine what and how to perform various operations, including different techniques such as determining dynamic values, adding additional values, and/or transforming values across interfaces, as discussed in detail below (e.g., with regard to FIG. 8). For example, an interface model 130 may be specified according to an interface modeling language, which may describe the various shapes (e.g., parameters), behaviors, and/or other information affecting the behavior of using different interfaces. For example, interface models may be document or other file written or otherwise specified in an interface modeling language, like Smithy, Swagger, or OpenAPI.

Request handler 110 may then traverse the various operations identified as part of the query plan to generate query result based on responses from different components 140. For example, one interface query 176, can be the equivalent of many programmatic interface requests 150 and may require many different permissions. For instance, two example scenarios may occur when 1) multiple unrelated requests and mutations may be included—this may be analogous to a batch operation where the permission for each individual operation may have to be checked; and 2) following references across programmatic interfaces 150 (graph traversal), such as when a chain of operations where each subsequent operation uses the result of the previous operation is performed.

Utilizing interface models 130 may allow request handler 110 to support both patterns with the same discrete, normalized operations that that can also enforce various authentication schemes. For the second pattern (graph traversal), each chained operation's output may be mapped to the subsequent operation's input shape described by the corresponding interface model 140 (e.g., as if a client that submitted the query 176 had directly invoked it). Mapping may provide input based on context from an ancestor operation (like the organization and/or project), an identifier resolved from a foreign key reference, a system-generated identifiers (like a test run d) can be used as-is, client-supplied names (like a project name) may be mapped from an internal surrogate key to the client-assigned name.

In some embodiments, graph traversal may support more advanced queries by pushing graph traversal responsibilities away from client-side interface implementations, which should greatly simplify request handling logic. For example, if there is a query "for all projects under my org, I want to see the first two workflows", request handler 110 would not have to issue a query for "listProject", grab all the project identifiers, and then make a subsequent query for multiple "listWorkflows" to get the first two workflows of each project, but could instead request handler 110 will be able to get all the information it needs in a single query by leveraging graph traversal.

Graph traversal may be implemented by leveraging existing programmatic interface requests 150. For example, if a new relationship is being modeled using traits (as discussed below), there may already be a way to traverse the nodes in a graph (e.g., representing different individual interface requests 150) by issuing a standalone get*/list* query. Therefore, if a relationship from "Organization" to "Project" is being modeled, and the trait is looking to leverage "listProjects" to resolve it, then there may already be a way to call "listProjects" directly and obtain the same result.

Please note, FIG. 1 is provided as logical illustrations of separate relationship management for application data objects, and is not intended to be limiting as to the physical arrangement, size, or number of components, modules, or devices to implement such features.

The specification first describes an example network-based application development and delivery service that performs modeling individual interfaces for executing interface queries over multiple interfaces. Included in the description of the example network-based application development and delivery service are various aspects of the example network-based application, build delivery, and development service. The specification then describes flowcharts of various embodiments of methods for modeling individual interfaces for executing interface queries over multiple interfaces. Next, the specification describes an example system that may implement the disclosed techniques. Various examples are provided throughout the specification.

Figure 2:
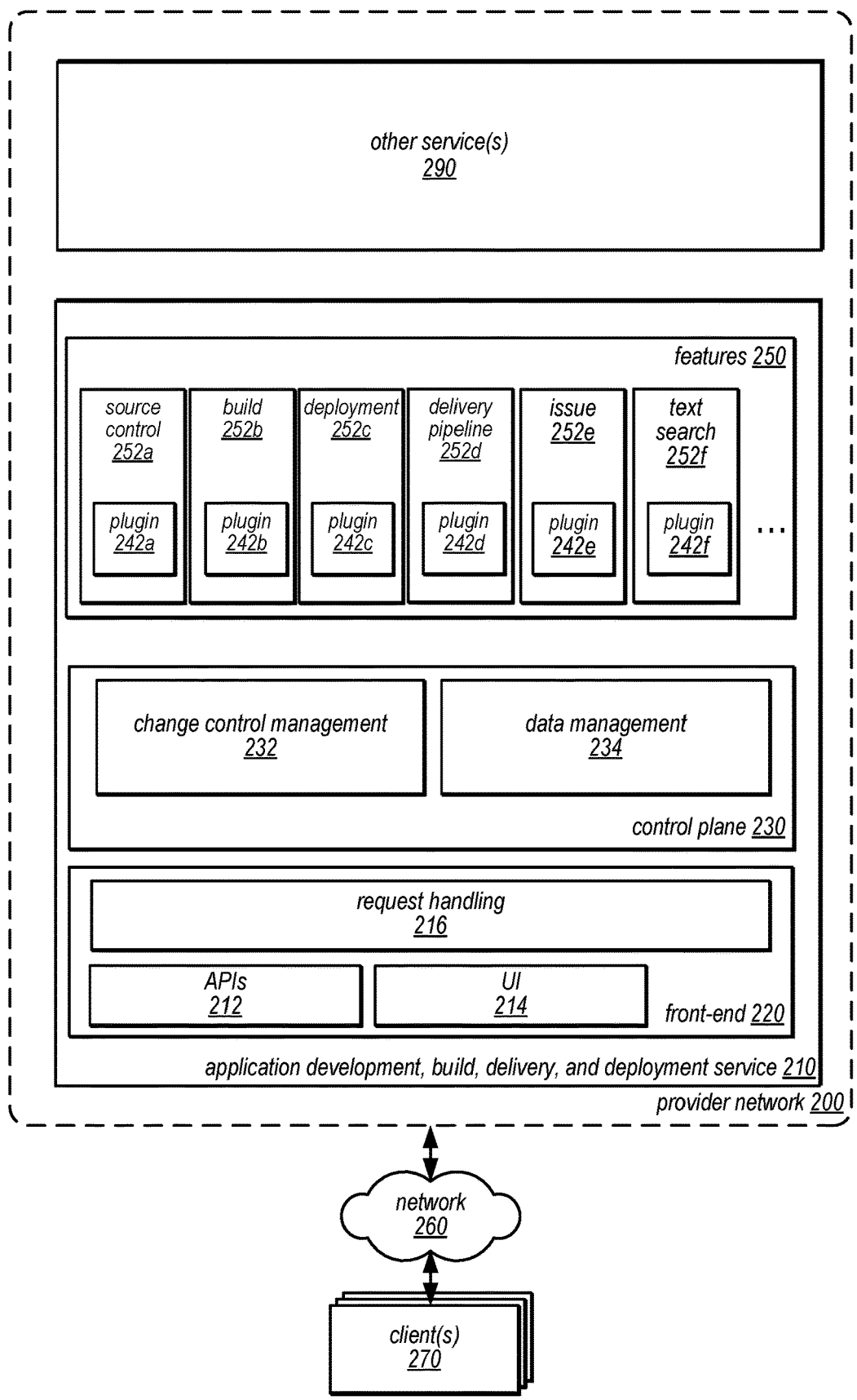
FIG. 2 is a block diagram illustrating a provider network that may implement an application development, build, deployment, and delivery service that implements modeling individual interfaces for executing interface queries over multiple interfaces, according to some embodiments.

FIG. 2 is a block diagram illustrating a provider network that may implement an application development, build, deployment, and delivery service that implements modeling individual interfaces for executing interface queries over multiple interfaces, according to some embodiments. Provider network 200 may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, such as clients 105 in FIG. 1, may be attached to the overlay network so that when a client 105 provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-6, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate may integrate with the tools to expose their functionality to end users. The platform services include a web UI 214 framework based on a micro-frontend architecture and a shared API layer. Application development, build, delivery, and deployment service 210 a data management system to facilitate data sharing across tools— and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications Text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance, as discussed in detail below with regard to FIG. 4.

As noted earlier, plugins may include plugins 242a, 242b, 242c, 242d and 242e, which may bused to access various development tools, such as features 250, including but not limited to source control 252a, build 252b, deployment 252c, delivery pipeline 252d, issue handling 252e, and text search 252f, which is discussed in detail below with regard to FIGS. 5-8. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for an interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced—in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252f may be a subscriber to various documents events that add, delete, or modify documents in order to make corresponding updates to inverted indexes.

Figure 3:
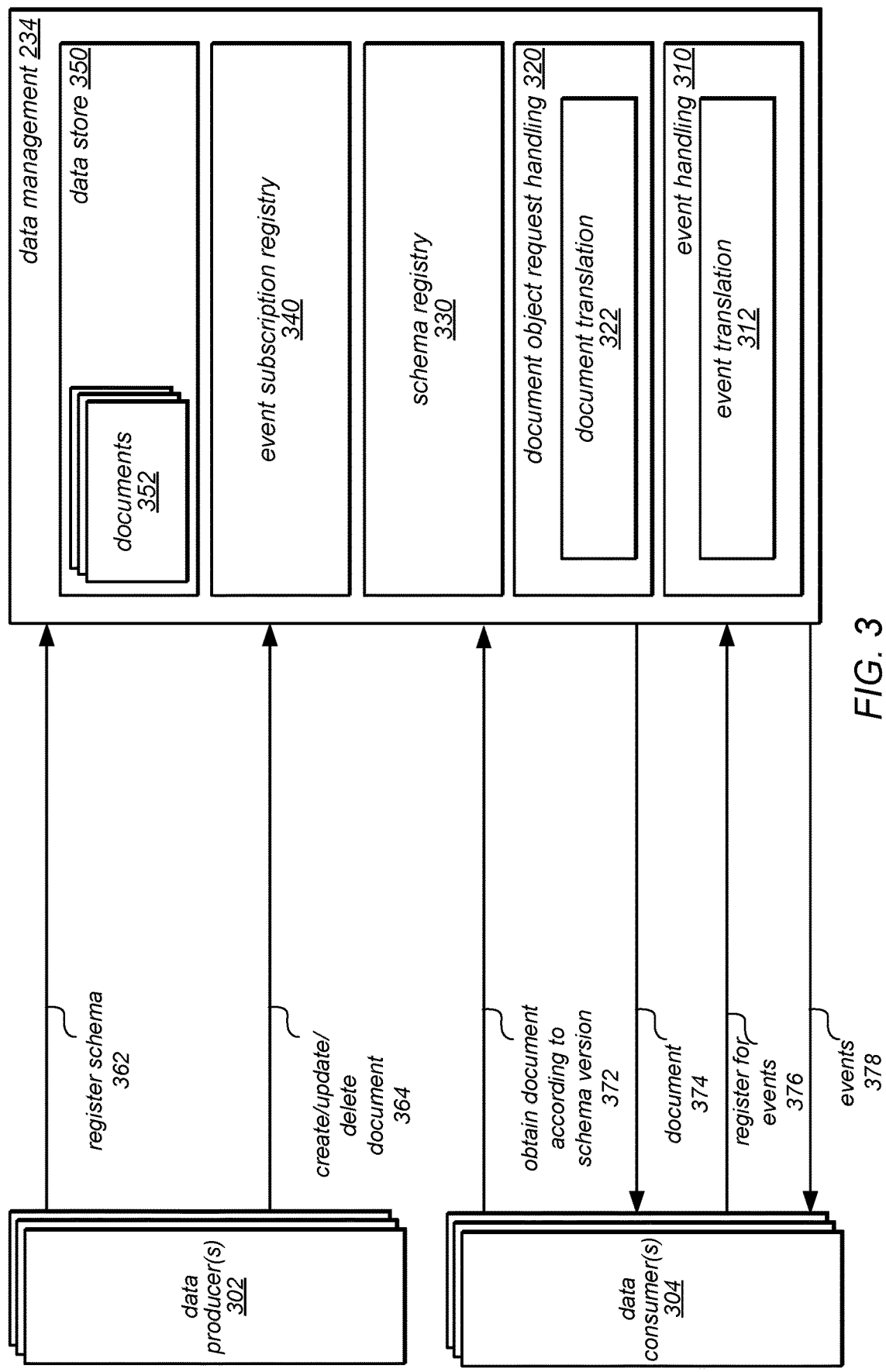
FIG. 3 is a block diagram illustrating data set management, according to some embodiments.

FIG. 3 is a block diagram illustrating an example data management system for the application development, build, deployment, and delivery service, according to some embodiments. Data management 234 may implement different types of request handling. Event handling 310 may perform event translation as part of handling different events, as discussed in detail below with regard to FIG. 6. Document object request handling 320 may perform document translation 322 as part of handling different document object requests.

For example, document object request handling 320 may receive document update requests, such as update request (e.g., to create, modify, or delete a document object). Document object request handling 320 may send a request to get applicable schema version(s) from schema registry 330. Schema registry 330 may identify the applicable schema versions (e.g., from mapping information) or may identify them from identifiers in the request. Schema registry may return the schema version(s) to document object request handling. Document object request handling 320 may use the schemas to determine the update fails to satisfy the schema(s), such as failing to satisfy a current version of the schema. If so, then a rejection of the update as invalid may be sent. Document object request handling 320 may then send a request to data store 350 to update the document according to the request. Document object request handling 320 may also send a notification of an update document event to event handling 310.

Similar techniques to those depicted with regard to document update can be performed to create a new document. For example, a create document request can be received at document object request handling 320, which include information, such as a file (or location thereof), or other information used to create the document. Again, document object request handling 320 may get applicable schema version(s) 320 so that document object request handling 320 can determine which schema version to apply to create the document. For example, the document may one of many documents that are created according to the same schema. Which schema version is applied may correspond to which plugin (e.g., which tool or other feature) submitted the document creation request. Mapping information may, for example, be used to determine which schema version is applicable to which requestor. In some embodiments, the request itself may specify the schema version. Document object request handling 320 may then store the document to data store 350. An event may be triggered or sent to event handling 310.

Schema registry 330 may provide storage for different schema versions, translation instructions and other schema information. A request to register a schema 362 may be received. For example, an interface of a data management system, like data management system 110 or 234, may support registration requests (e.g., via API, graphical user interface, command line interface, and so on), in order to provide a new version of a schema (e.g., specified as a JSON or other script, programming code, or language) with an associated data object (e.g., a document or event stream). In some embodiments, the schema may include or link to instructions (e.g., scripts, programming code, or language) for translating between the version of the schema being registered and one or more prior versions of the schema (e.g., describing what data field was added, changed, removed, etc.).

The registration request may be rejected, in some embodiments, if the request or updated schema fails a validation technique, such as analysis indicating that the version of the schema fails to conform to various stylistic or other constraints on schemas (e.g., using invalid data types). A response indicating that the registered version of the schema is invalid may be returned.

The version of the schema may be added to a registry 330 for schemas for data objects, in some embodiments. For example, a database or other data storage system may store a schema as a document, file, or other object. A link, mapping, or other association may be updated to identify which data object(s) (e.g., event stream or document) the schema is applicable to (e.g., a version number, a schema identifier and data object identifiers).

Event subscription registry 340 may support storage for data consumers to register for events. Data store 350 may store data for data objects, such as documents 352 and event streams (not illustrated).

Data producers may submit various requests, including registering a schema 362, creating, updating, or deleting a document, as indicated at 364, creating an event stream, or submitting events. For example, data consumers may submit various requests and receive various responses, including requests to obtain a document according to a schema version, as indicated at 372, receive the document 374, register for events, as indicated at 376, and receive events, as indicated at 378. For example, document object request handling 320 may handle requests to obtain documents. Document object request handling 320 may get the applicable schema versions from schema registry 330. Document object request handling 320 may also get the document from data store 350. If translation should be performed, then translation instructions may be used and the document sent to the data consumer 304.

Similarly, in another example, events may be received either from their submission to data management 234 as part of an event stream or as an event related to a document update or creation (as noted above). Event handling 310 may send a request to get applicable schema(s) for the event to schema registry 330. Schema registry may identify the applicable schemas (e.g., based on mapping information) or may return those schema(s) identified in the request (e.g., by version and schema identifier). The schemas may be returned.

Event handling 310 may use the schemas to evaluate the validity of the event. If the event does not satisfy the schema(s), then it may be rejected, as indicated at 607. If valid, event handling 310 may send a request to event subscription registry to get 609 subscribers for the event (e.g., subscribers to an event stream or document). Event subscription registry 340 may return the subscribers. Event handling 310 may determine, based on the subscribers, whether translation should be performed (e.g., does an event subscription have a schema version identifier matching the event, or an earlier schema). If translation should not be performed, then the event is sent. If translation should be performed, then translation may be performed using translation instructions between schemas and the translated event sent.

Figure 4:
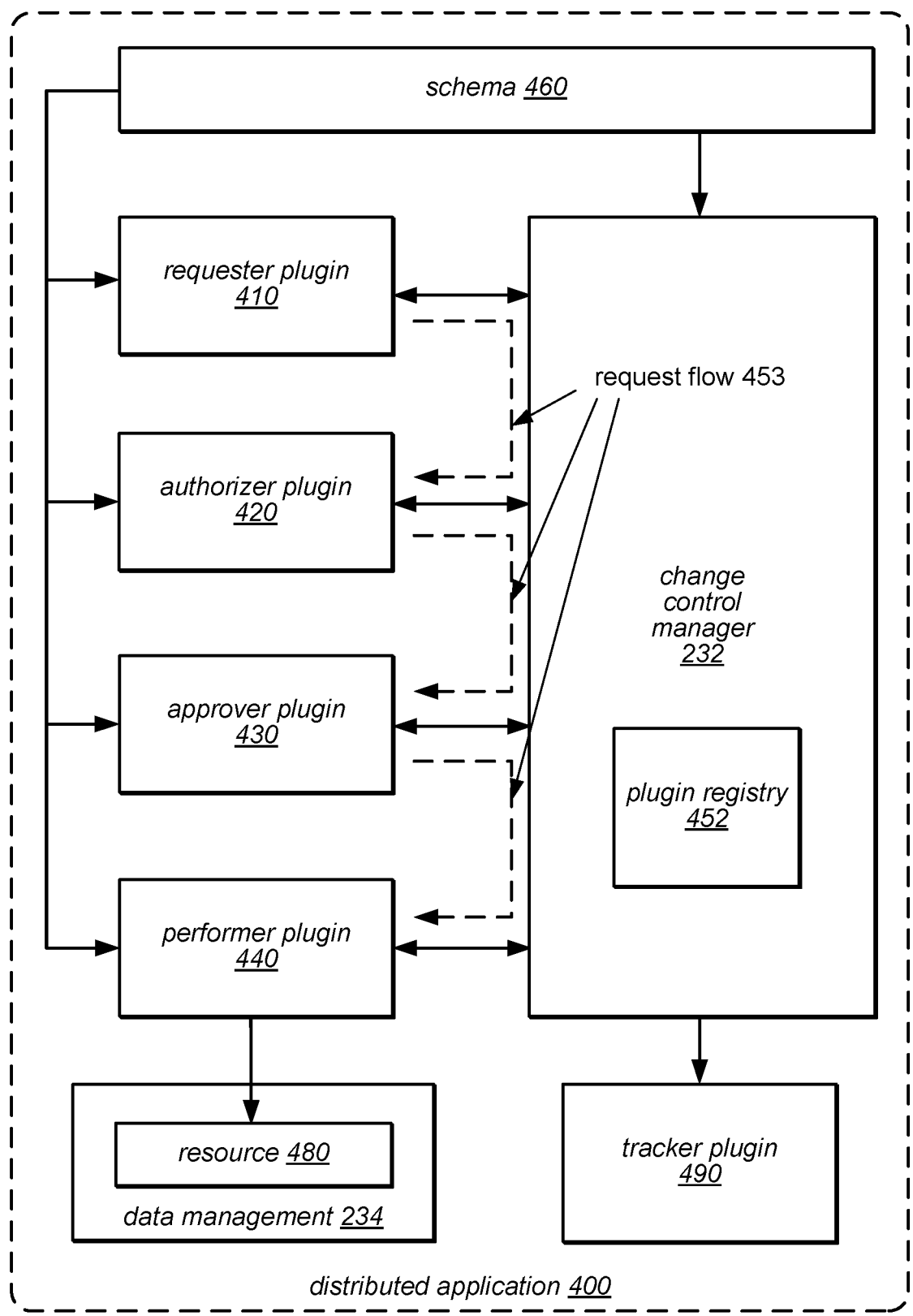
FIG. 4 is a block diagram illustrating change control management, according to some embodiments.

FIG. 4 is a block diagram illustrating extensible change control management, according to some embodiments. Distributed application 400, such as an application that utilizes various plugin components to integrate, support, and extend the capabilities of the distributed application 400, may include a change control manager 232 which may implement changes to a resource 480 stored in data management 234 using various plugins 410, 420, 430 and 440, in some embodiments, identified in plugin registry 452. Plugin registry 452 may be a registry for a single resource (or organized to group registered plugins by resource) in a data structure (e.g., table, index, etc.). The resource 480 may be of a particular resource type, with the resource type having an associated schema 460. Various change operations for the resource 480 may be encoded using the schema 460, and the various plugins 410, 420, 430 and 440 as well as the change control manager 232 may access the schema 160 during communication of these operations.

A requester plugin 410 may submit requests for changes to the resource to change control manager 232. These requests for changes may follow a typical request flow 453. These requesters may, in some embodiments, provide various user interfaces (UIs) or Application Programming Interfaces (APIs) or other programmatic interfaces to allow users to submit change requests to the change control manager. In other embodiments, a requester plugin may perform other plugin roles for the resource of for other resources and may submit change requests as part of fulfilling other plugin roles. These examples, however, are not intended to be limiting, and any number of requester plugin implementations may be envisioned.

An authorizer plugin 420 may authorize or reject change requests submitted to the change control manager 232 by requester plugins. An approver plugin 430 may approve or reject change requests submitted to the change control manager 232 by requester plugins. A given resource may have any number of registered approver plugins in plugin registry 452, in various embodiments.

A performer plugin 440 may perform approved change requests submitted to the change control manager 232 by requester plugins. In some embodiments, a plugin may implement more than one plugin function for a resource or the same or different plugin functions for different resources. For example, in some embodiments, a plugin may implement both an approver plugin function as well as a performer plugin function for a resource, as discussed below. It should be understood, however, that some combinations of plugin functions may not be allowed, for example, a plugin implementing both a requester function and an approver function for the same resource. These examples, however, are not intended to be limiting and any number of plugin implementations may be imagined.

In addition, a tracking plugin 490 may receiving notifications of various events associated with the resource 480. A change performer plugin component 440 may advertise possible changes and reference the projected consequences to a resource 480 stored within data management 234.

For example, a performer plugin 430 may advertise a change to merge a pull request with the consequence that the tip of the destination branch will change. Change approver plugin 430 may be required to record approval in change control manager 232 before a change can proceed. For example, if it is desirable to use an advisory time window plugin, that plugin would have to approve changes to deployed environments before they are enacted—a time window plugin would reject changes that take place during an advisory period. Change approver plugins 430 can pre-approve a change where applicable. For example, when evaluating whether a user can merge a pull request, in most cases it is not necessary to wait for a user to actually request the merge to determine if it is allowed. Change requester plugin 410 may start the process of enacting a change.

These requester plugins could be client plugins that provide user interfaces (UIs) that make these requests on behalf of end users but they could also be feature plugins. For example, a delivery pipeline plugin (e.g., plugin 242*d* as shown below in FIG. 2) could be a change requester 410 and initiate changes to each target resource according to its orchestration rules instead of directly performing these changes itself. Finally, change performers 440 complete the process by enacting approved changes and recording the results in change control manager 160 and data management 234. Plugins may perform combinations of these roles, but it may be rare, in some scenarios, for a plugin to perform multiple roles for the same type of change—for example, it is not expected that a plugin will be an approver for its own changes.

Figure 5:
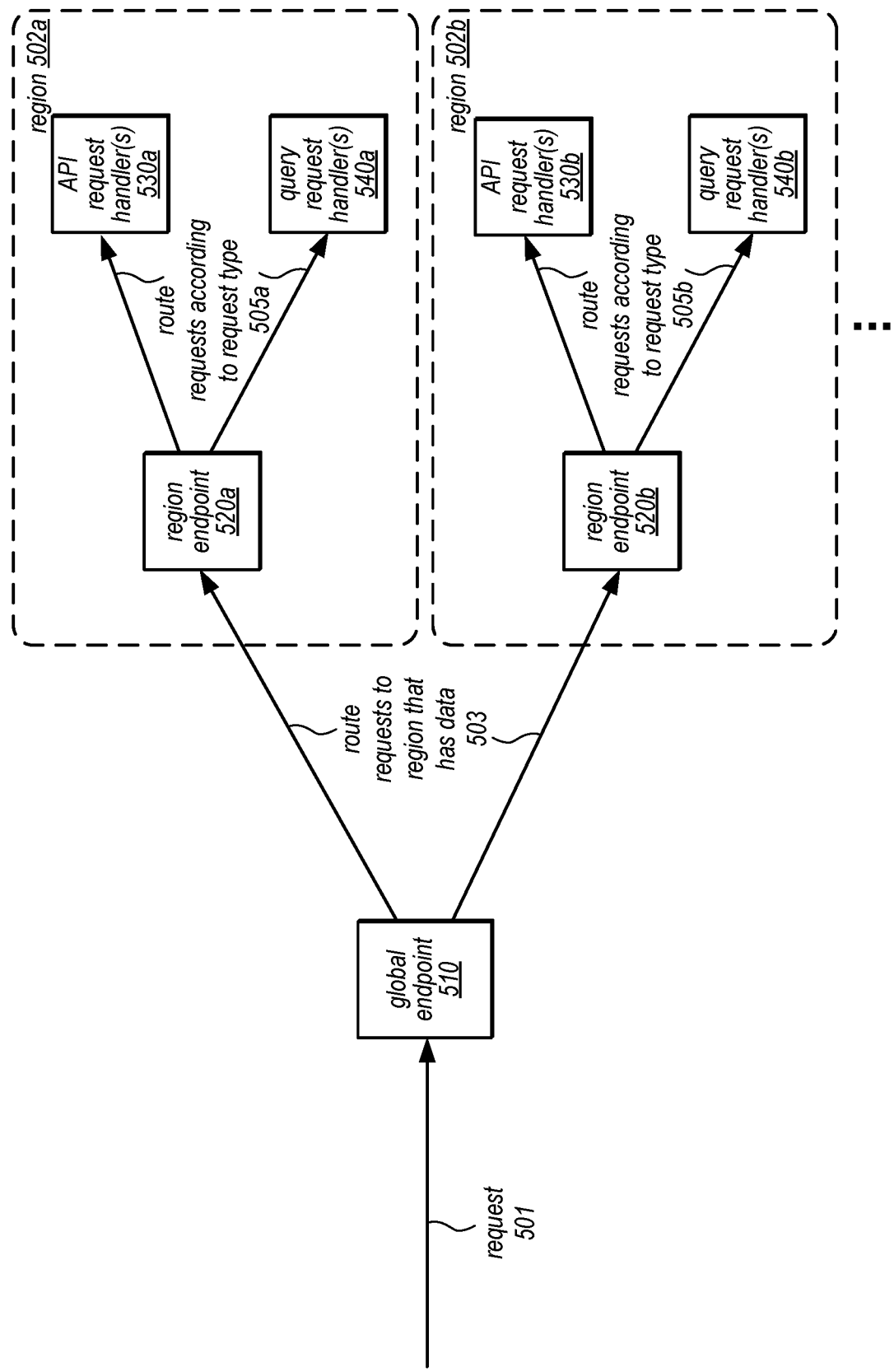
FIG. 5 is a block diagram illustrating request handling across regions of a provider network, according to some embodiments.

FIG. 5 is a block diagram illustrating request handling across regions of a provider network, according to some embodiments. Global endpoint 510 may be implemented, as a network address, location, and/or other network accessible to receive various requests for application build, development, delivery, and deployment service 210, such as request 501, over a public network (e.g., the Internet). Global endpoint 510 may then be able to identify, based on the request, the home region of the data for the request 501. For example, a region identifier may be included in request 501 or mapping information for an identifier that is the target of or associated request 501 may be mapped to a particular one of regions 502*a* or 502*b* of provider network 200. Global endpoint 510 may then route request to the region that has the data, as indicated at 503. Note that global endpoint 510 may, in some embodiments, be a global identifier (e.g., a URL) which may still route request 501 to a closest region endpoint which may behave as global endpoint 510 and route the request to a different region if another region has the data.

In various embodiments, each region may have its own region endpoint, such as region endpoint 520*a* in region 502*a* and region endpoint 520*b* in region 502*b*. Region endpoints 520 may route requests according to the request type. For example, direct API requests may be sent to respective API request handlers 530*a* and 530*b*, which may send or otherwise invoke the API request (e.g., directly to a control plane component change control management 232, data management 234, or to component, service, feature or other tool which may be implemented as part of or support operations of application development, build, delivery, and deployment service 210). For queries that are specified according to an interface query language, such as GraphQL, region endpoints 520 may route the requests to respective query request handlers 540*a* and 540*b*.

Although not illustrated, interface models may be used for handling API requests at API request handlers 530. For example, an interface modeling language, such as Smithy, may be used to describe the shapes for input and output of APIs so that whether an API is invoked directly by API request handlers 530 or through an interface query, discussed in detail below, request handlers like API request handlers 530 can translate a protocol-specific request to the model described input shape, executes the operation and then translates the model described output shape back to a protocol-specific response.

Figure 6:
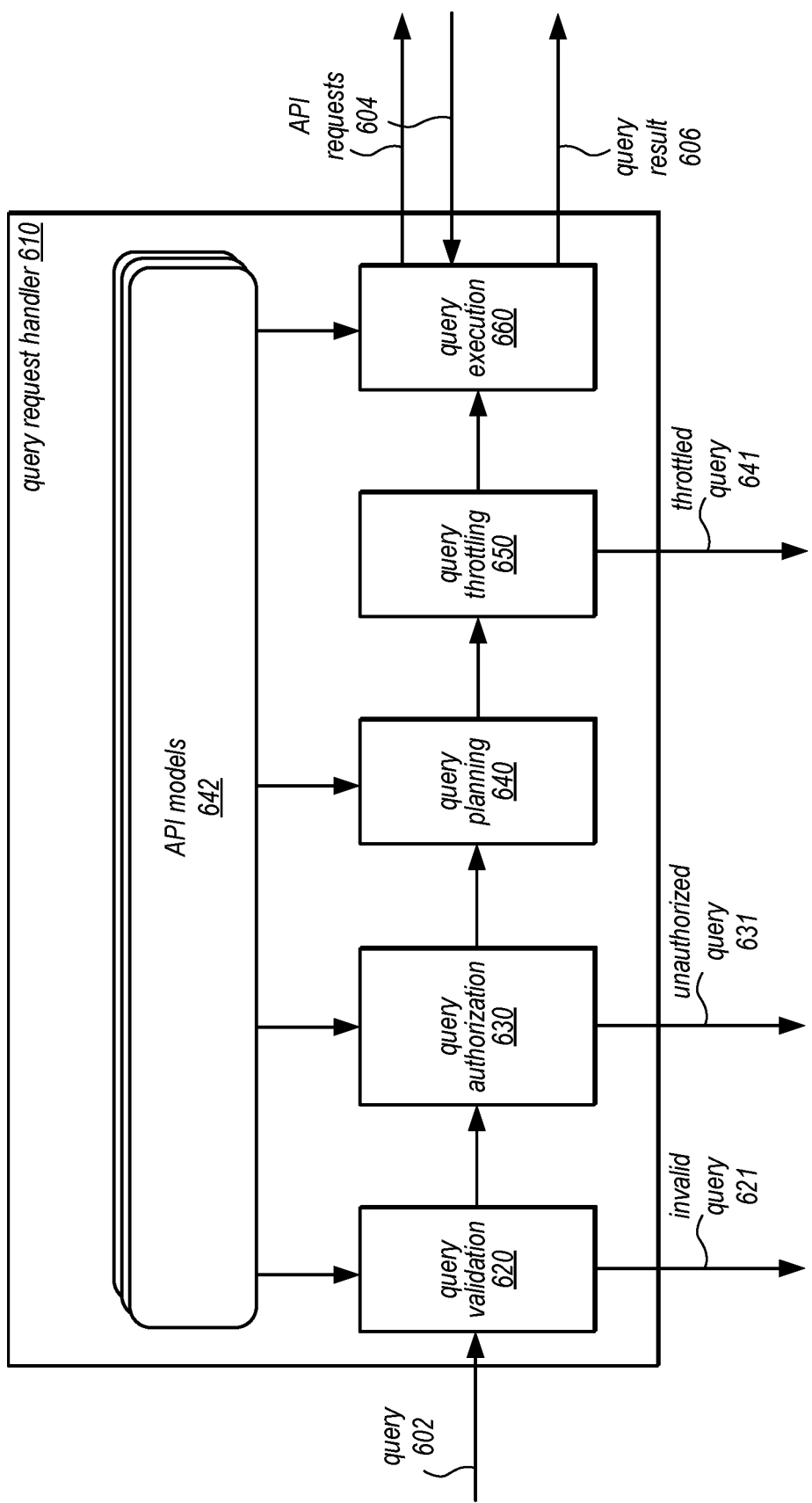
FIG. 6 is a block diagram illustrating a request handler for interface queries, according to some embodiments.

FIG. 6 is a block diagram illustrating a request handler for interface queries, according to some embodiments. Query request handler 610 may be the same or similar to query request handlers 540 in FIG. 5, or request handler 110 in FIG. 1. An interface query 602 may be received that is specified in a query interface language. Query request handler 610 may implement query validation 620 to perform various checks, confirmations, or analysis of the query 602 itself. For example, query validation may determine whether any errors in syntax or features of the query, such as unknown features are present. Invalid queries, such as invalid query 621, may be identified and rejected or responded to with an error indication (e.g., error indicating invalidity). API models 642 may be used to validate queries (e.g., indicating correct syntax or supported features in the different APIs that may be invoked to perform query 602).

Query authorization 630 may be implemented by query request handler 610, in some embodiments. For example, query authorization 630 may examine, obtain, and/or evaluate (or cause the evaluation of) credentials, such as a username/password, token, or other information to determine whether the query is authorized to access and/or obtain the desired information specified in query. In some embodiments, a separate identity and authorization service of provider network 200 may be used. Unauthorized queries, such as unauthorized query 631, may be identified and rejected or responded to with an error indication (e.g., error indicating lack of authorization). API models 642 may be used to authorize queries (e.g., indicating how the different APIs that may be invoked to perform query 602 may be determined to be authenticated or otherwise authorized).

Query planning 640 may be implemented as part of query request handler 610. Query planning may be able to access API models 642 which may be describe the input and output of the various APIs referenced in query 602 (e.g., the shape of the APIs). Applicable API models 642 may be identified according to a feature (e.g., API name) included in query 602. Query planning 640 may determine the cost of executing a query (e.g., according to the techniques discussed below with regard to FIG. 7, such as determining a number of times different APIs may be executed). As discussed in detail below with regard to FIG. 8, different traits may be used as part of API models 642 to support additional outputs and output transformations, in some scenarios, for executing query 602. Query throttling 650 may throttle queries that exceed or otherwise satisfy throttling criteria (e.g., too costly or other indication of work to perform a query), and may be identified and rejected or responded to with an error indication (e.g., error indicating throttling or execution cost).

Query execution 660 may execute query 602 according to a plan generated at query planning 640 to perform query 602. For example, query execution 660 may perform node traversal or other techniques to pass the output data of one API request 604 as an input into a subsequent API request 604. When API requests and responses 604 have been received for query 602, query execution 660 may generate, formulate, or otherwise prepare the result for the query, as indicated 606 (e.g., by organizing the request data in the format specified in query 602, including eliminating and/or not including information not requested by query 602. API models 642 may be used to validate queries (e.g., indicating how dynamically determined values are obtained).

The application build, development, delivery, and deployment service 210 discussed in FIGS. 2 through 6 provide examples of a system that may implement modeling individual interfaces for executing interface queries over multiple interfaces. However, various other types of deployment or development systems may implement such techniques as well as other services or distributed applications which may provide a unified interface that supports both complex interface queries and direct programmatic interface requests without limiting the extensibility or adaptability of the service for new or updated features.

Figure 7:
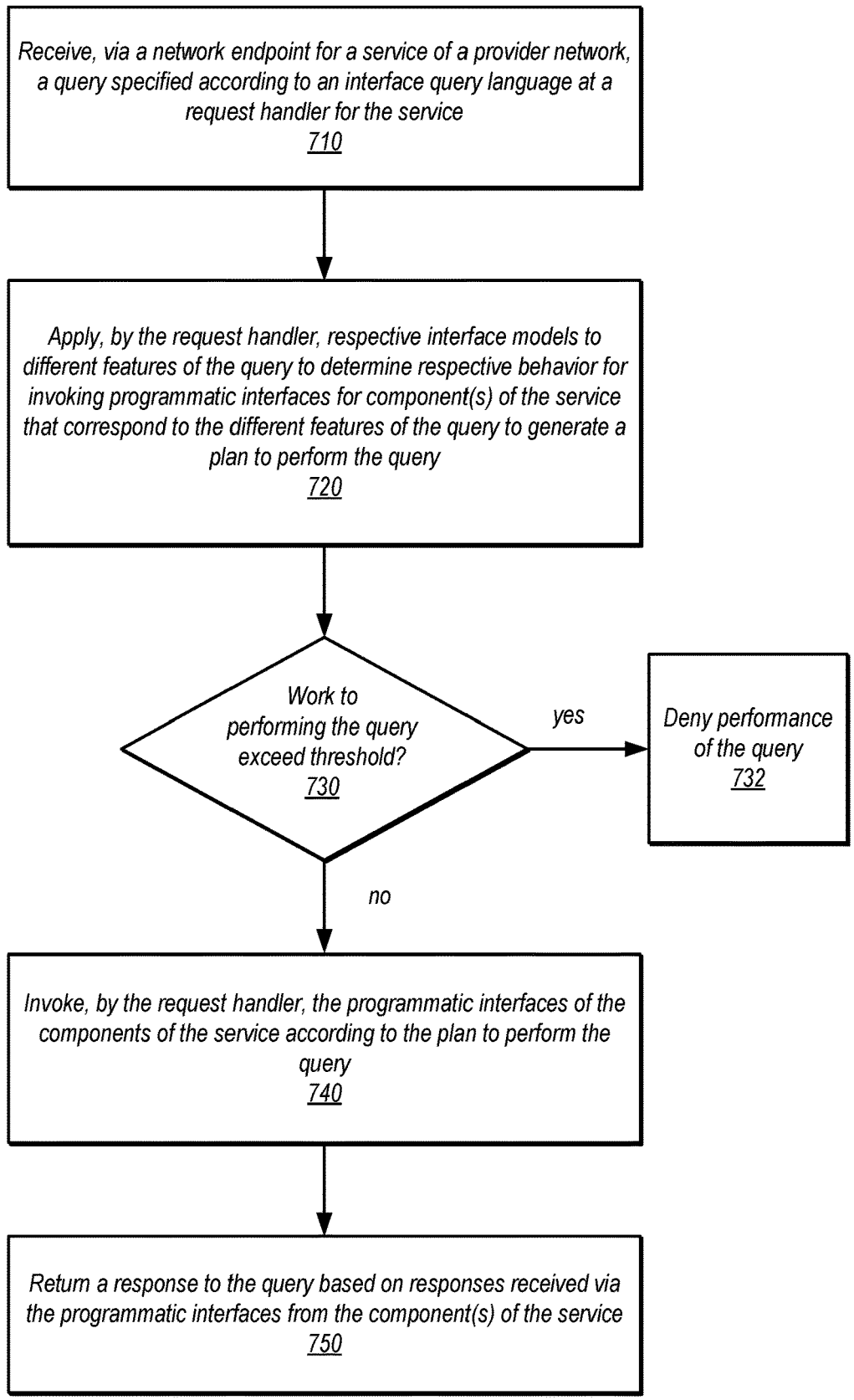
FIG. 7 is a high-level flowchart illustrating various methods and techniques that implement modeling individual interfaces for executing interface queries over multiple interfaces, according to some embodiments.

FIG. 7 is a high-level flowchart illustrating various methods and techniques that implement modeling individual interfaces for executing interface queries over multiple interfaces, according to some embodiments. Various different systems and devices may implement the various methods and techniques described below, either singly or working together. For example, an application build, development, delivery, and deployment service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 710, a query specified according to an interface query langue may be received via a network endpoint for a service of a provider network at a request handler for the service. For example, a network endpoint may be a global endpoint, as discussed above with regard to FIG. 5 or at a region or other service-location specific endpoint. A network endpoint may be a network address or other location that routes requests to computing resources, such as various servers or other networking devices, that can make forwarding decisions to the request handler (or implement the request handler). The interface query language may allow the query to specify which data and the organization of the data to return, in various embodiments. For example, a GraphQL query may be received that lists pull requests in a project, ordered by create date with the author's profile image, name and workflow details may be specified as in the below example:

```
query {
    organization(name:"ORG1") {
        project(name: "PROJ1") {
            pullRequests(first:50, filter:[{"status":"open"}],
                    sort: [{""""createdAt": "DESCRIPTION"}])
            pullRequest {
                id title
                createdAt
                author {
                    displayName avatar
                }
                workflows(first:5) {
                    workflow {
                        name
                        status
                    }
                }
            }
        }
    }
}
```

As indicated at 720, respective interface models may be applied to different features of the query to determine respective behavior for invoking programmatic interfaces for component(s) of the service that correspond to the different features of the query to generate a plan to perform the query. For example, as discussed above, the interface models may be used to bind programmatic interface (e.g., API) shapes to the shapes of documents for a document-based control plane as discussed above using model traits specified according to an interface modeling language (e.g., Smithy), such as "@schema"—to specify a data management-registered schema ID, "@document"—that specifies a document operation, like create, delete, get, list, rename and update, and "@property"—that specifies the name of a document property and may use a "." to reference nested document properties.

The plan may be represented as a graph, tree, or other structure for specifying the links between operations that may be chained (and/or operations that may be executed in parallel to different components). Work to perform the query (e.g., cost or other considerations) may be analyzed with respect to the plan, as discussed below with regard to element 730. Consider that queries across interfaces may cause a traversal across interfaces (e.g., as specified nodes in a graph representation of the plan), which may bundle several operations into a single query, potentially requesting enormous amounts of amounts of data. To prevent careless (or intentional) design of bad queries, the request handler can analyze the entire request before attempting to resolve the individual operations, to determine the impact of the query when deciding to allow it or reject it, such as according to a threshold compared to the amount of work to perform the query as indicated at 730.

For instance, the amount of work to perform the query may be represented as a cost (e.g., the amount of various computing resources, such as processor, network, memory, storage, etc.), where a total cost of the request in terms of resources being queried may be determined. Each operation may have a cost associated to it. For "get" operations, the cost is "1". For list operations, the costs is the value of its page size member. If a value for the page size was not provided, a default value of (e.g.,"10") could be assumed. A default cost may be provided via an interface model feature (e.g., an annotation) in some embodiments.

The example query below may provide a working example for illustrating cost estimation techniques:

```
query Inception {
    OrgB: getOrganization(input: {
        name: "Bloomberg"
    }) {
        name
        projects(pageSize: 10) { # mixin of Project
            items {
                name
                workflows(pageSize: 10) { # mixin of Workflow
                    items {
                        workflowName
                        runs(pageSize: 10) { # mixin of WorkflowRun
                            items {
                                workflowRunId
                            }
                        }
                    }
                }
            }
        }
    }
    OrgA: getOrganization(input: {
        name: "OrgA"
    }) {
        name
        projects(pageSize: 10) { # mixin of Project
            items {
                name
                workflows(pageSize: 10) { # mixin of Workflow
                    items {
                        workflowName
                        runs(pageSize: 10) { # mixin of WorkflowRun
                            items {
                                workflowRunId
                            }
                        }
                    }
                }
            }
        }
    }
```

```
        }
    }
}
```

The plan for such an example query may be represented as an operation tree, like below:

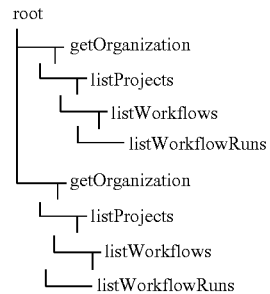

A total cost may be determined by applying a formula, such as totalCostOfNode=selfCost+ (childrenCost*maximum(1, selfCost)), where selfCost is the cost of the current operation, and childrenCost is the sum of the total cost of the node's children. Such a formula could be used to determine the operation tree with cost values, like below:

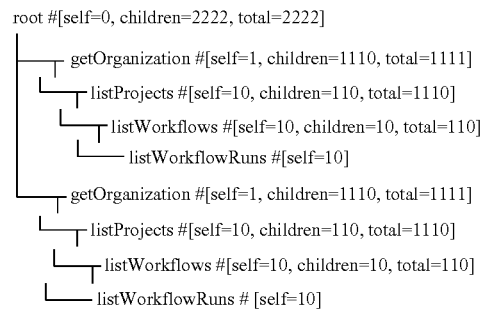

A determination may be made if the cost of performing the query exceeds a cost threshold, in some embodiments, as indicated at 730. For example, if the cost threshold is 2,000 then the above query would exceed the threshold. For queries exceeding the threshold, performance may be denied, as indicated at 732, and may include sending an error indication for the cost threshold violation.

As indicated at 740, the request handler may invoke the programmatic interfaces of the components of the service according to the plan to perform query, in some embodiments. For example, different API requests may be send using input data from the query and, where indicated by the plan, output data from prior API responses in the plan. Such traversal techniques may be performed in order to return a response to the query based on responses received via the programmatic interfaces from the components of the service, in some embodiments, as indicated at 750. For example, the query may specify the structure or format for returning data, as well as which values should be returned.

Figure 8:
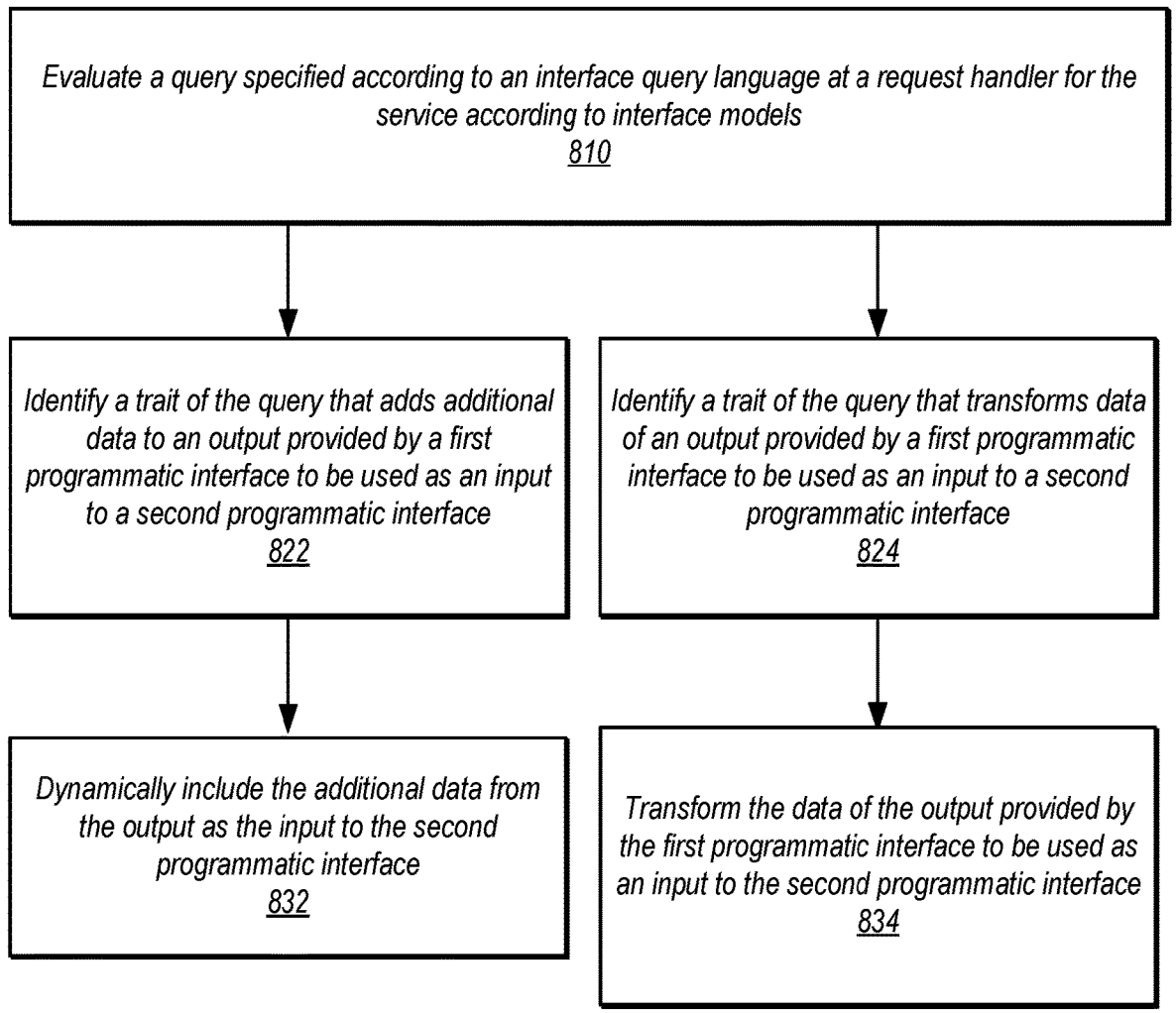
FIG. 8 is a high-level flowchart illustrating various methods and techniques that implement evaluating interface queries for performing the interface queries, according to some embodiments.

FIG. 8 is a high-level flowchart illustrating various methods and techniques that implement evaluating interface queries for performing the interface queries, according to some embodiments. As discussed above, interface models may be used to perform a query. As indicated at 810, an evaluation of a query specified according to an interface query language may be performed at a request handler of a service according to interface models.

Different traits in the models may be used to support different query features. For example, as indicated at 822, a trait of the query that adds additional data to an output provided by a first programmatic interface may be used as an input to a second programmatic interface. As indicated at 832, as part of performing the query, the request handler may dynamically include the additional data from the output as the input to the second programmatic interface.

Consider the following example. A "@mixins" trait may be added to an output structure of an interface model. A "mixin" may represent a single member being added to an output structure and contains all the information the request handler needs to include it in the shape and resolve it. A "mixin" may include in its definition, name, which may be the name of the member being added to the shape, resource, which may be the resource this member is targeting, and query, a representation of the input being passed to the target operation (e.g., in JSON). Request handler may take the value of the query property, perform the necessary replacements of dynamic values, and pass it as the input of the resource's list operation.

For instance, assume it is desirable for the output of "getOrganization" to provide a way to access the organization's projects. In order to satisfy the requirement, the @mixins trait can be used to add a Mixin to the source. In this case, a member may be added being named projects that will target the Project resource (leveraging the listProjects operation to resolve the relationship). A shape listProjects may be specified as:

```
structure ListProjectsInput {
    @required
    organizationName: NameString
}
```

In view of the the target input shape, the organizationName property may be passed. Since the Mixin is being added to the source shape GetOrganizationOutput and this shape has a member called name, a dynamic value can be used by using the "this" object to as a reference to a value that is then used to be replaced with an actual value, which may, for instance, access the value of the current shape. For example:

```
@mixins([
    {
        name: "projects",
        resource: "Project1",
        query: {
            organizationName: {
                "$ref": "this.name"
            }
        }
    }
])
structure GetOrganizationOutput {...}
```

As a result of adding the mixin to the model, an example query leveraging this change may be:

```
# Request
query {
    getOrganization(input: {
        name: "OrgA"
    }){
        id
        name
        projects {
            items {
                id
                name
            }
        }
    }
}
# Response
{
    "data": {
        "getOrganization": {
            "id": "913c06fb-56ad-458f-93c5-3f87f53706ee",
            "name": "OrgA",
            "projects": {
                "items": [
                    {
                        "id": "7df84d37-813d-4396-8109-858ff3220142",
                        "name": "PortfolioPlanner"
                    },
                    {
                        "id": "ba1c57e2-266e-4279-8117-f761a4dee9aa",
                        "name": "Datafeeder"
                    }
                ]
            }
        }
    }
}
```

In the above example, the request handler may detect that "projects" is a Mixin targeting the Project resource. It called listProjects and passed the value of the Mixin's query (after replacing all dynamic values) as the input of the operation.

Evaluation 810 may identify other traits for performing a query. As indicated at 824, a trait of the query that transforms data of an output provided by a first programmatic interface may be used as an input to a second programmatic interface, in some embodiments. As indicated at 834, the data of the output provided by the first programmatic interface may be transformed to be used as an input to the second programmatic interface, in some embodiments.

For example, the "@bridges" trait may be used for transforming existing members that hold foreign key values (FK), into references to other resources. For example, if an output shape defines a workflowId member which is a String that represents a Workflow, the trait can be leveraged to establish a Bridge so that the property is offered in GraphQL as the Workflow resource, rather than a plain String. Note that unlike @mixins which appends new members to the output shape, @bridges transforms existing members.

In some embodiments, @bridges may be specified by resource, name which may be the fully qualified name of the resource, and identifier, the property of the input shape that will be passed the FK as a value, and "as" which may be a new name for the member that more closely matches the new type (e.g., since rather than being a String it turns into a resource, eg., workflowId→workflow).

The request handler may resolve @bridges by using the get operation of the target resource referenced by name. It inspects the input members of the operation and attempts to find the corresponding values based on the resolution context. The first thing it does is set the identifier member (given by identifier) to the value of the FK. Next, it attempts to extract the remaining members out of the resolution context.

It does so by looking at the traversal path it took to get to the current operation, and seeing if it can inherit the values for those remaining members.

Consider an example where assume WorkflowRun wants to provide a Bridge to the Workflow that owns it. To look at how to get the Workflow, an inspection of the input shape of the GetWorkflow operation may be made:

```
structure GetWorkflowInput {
    @required
    organizationName: String,
    @required
    @property(name: "id")
    workflowId: String
}
```

The request handler can determine that workflowId is the internal system identifier, and the other attributes are there to provide hierarchy information. This means that for anyone wanting to model a Workflow bridge, the FK itself would be a value for workflowId of the above shape, and all other properties would be taken from the resolution context by a request handler. As WorkflowRun is backed by a data management system, a property called workflowId of type String to hold the value of the FK may be added. The @bridges trait may be added to this member in the source output shape so the Bridge can be established:

```
structure GetWorkflowRunOutput {
    ...
    @required
    @bridges(as:"workflow", resource: {name:"orgB#Workflow",
        identifier: "workflow"
    }
    workflowId: String
}
```

An example of the request:

```
# Request
query {
    getWorkflowRun(input: {
        organizationName: "OrgB"
        workflowRunId: "9999999999"
    }){
        workflowRunId
        workflow {
            workflowName
        }
    }
}
# Response
{
    "data": {
        "getWorkflowRun": {
            "workflowRunId": "9999999999",
            "workflow": {
                "workflowName": "My workflow"
            }
        }
    }
}
```

From a resolution standpoint, the request handler can determine that the workflow member is a FK to Workflow. It looked at the input shape of the target get operation and detected that it needed to provide two values in the input: organizationName and workflowId. Because of the identifier of the bridge, the FK may hold the value of workflowID. The remaining member, organizationName, was obtained by looking at the current operation's parent's input in the request (getWorkflowRun) and extracting the value of the property by the name organizationName.

For the above, and other query resolution techniques, a dynamic value determination may be performed. For example, a request handler may support the use of dynamic values as part of the query definition to pass dynamic information to the query object. The request handler may replace the dynamic value object with the appropriate value depending on the source of the information. For example, a dynamic value object may be specified as:

```
structure {
    $ref: String
}
$ref
$ref = ref_object "." ref_property
ref_object= "this" | "ctx"
ref_property = *ALPHA
```

The "this" object refers to any property from the shape the trait is being declared on. For example, if the trait is added to GetOrganizationOutput, it should allow you to pick any member of such shape. The "ctx" object may allow access to properties depending on the context of the operation, such as "organizationName" and "projectName".

Figure 9:
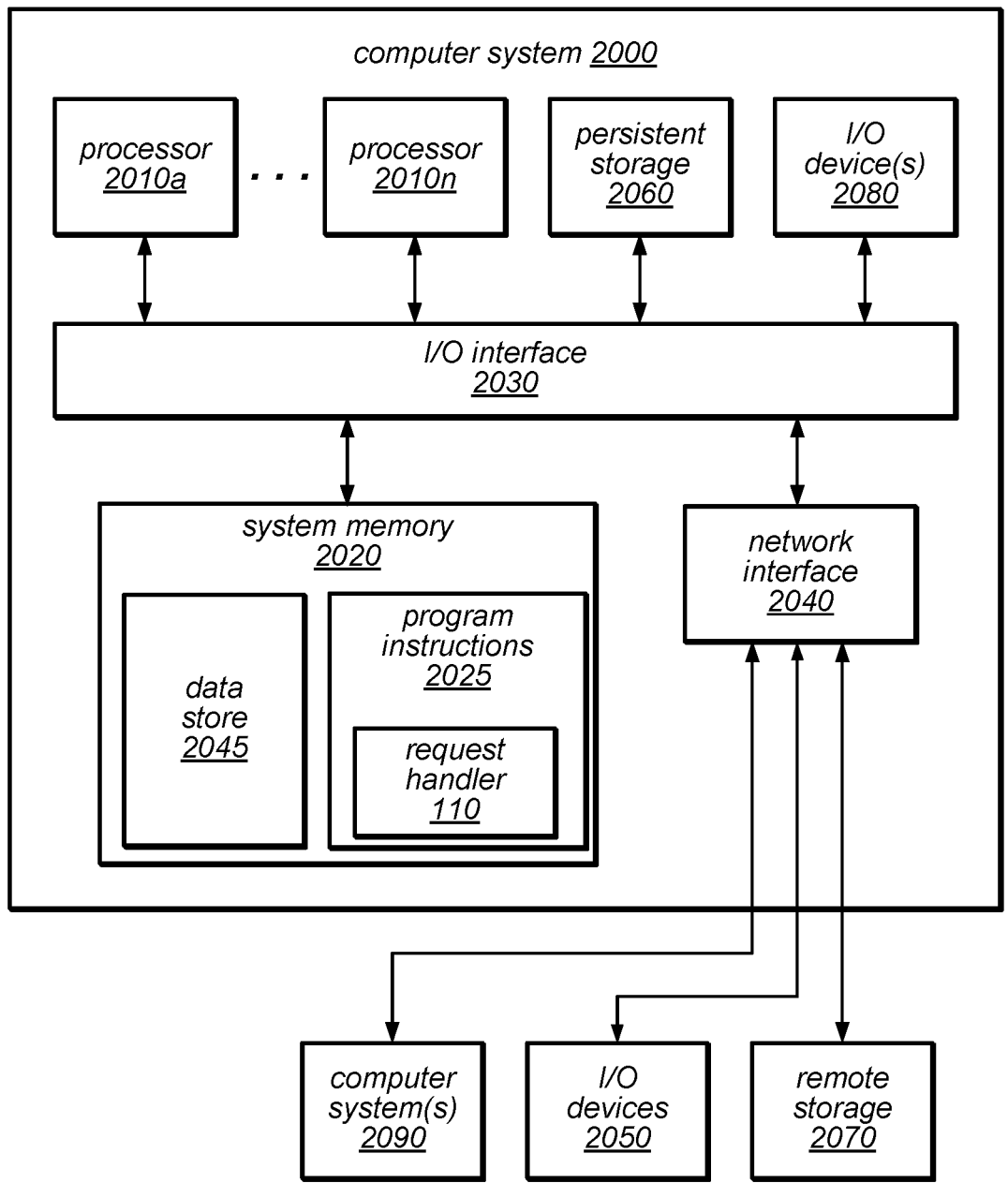
FIG. 9 is a block diagram illustrating an example computer system, according to various embodiments.

Any of various computer systems may be configured to implement processes associated with a technique for modeling individual interfaces for executing interface queries over multiple interfaces as discussed with regard to the various figures above. FIG. 9 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above such as request handler 110, for the downloadable software or provider network are shown stored within system memory 2020 as program instructions 2025. In some embodiments, system memory 2020 may include data store 2045 which may be configured as described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:
1. A system, comprising:
    at least one processor; and a memory, storing program instructions that when executed by the at least one processor, cause the at least one processor to implement a request handler for a service of a provider network, the request handler configured to:

receive, via a network endpoint for the service of the provider network, a query specified according to an interface query language;

generate a plan to perform the query, wherein in generating the plan to perform the query, the program instructions cause the at least one processor to implement:

applying respective interface models to different features of the query to determine respective behavior for invoking a plurality of different Application Programming Interfaces (APIs) for one or more components of the service that correspond to the different features of the query based, at least in part, on respective descriptions of interface behaviors in the respective interface models, wherein the respective interface models are specified using respective documents in a data store that controls updates to the respective documents with a change control manager of the service, wherein at least one of the respective interface models includes at least one change to the at least one interface model according to a change to one of the respective documents approved using the change control manager of the service; and according to the respective behavior determined for invoking the plurality of different APIs, generate the plan to perform the query, wherein the plan comprises instructions to invoke selected ones of the different APIs to perform one or more features of the query, wherein the selected ones of the different APIs include an API updated in accordance with the at least one change to the at least one interface model; and send requests to the one or more components of the service, via the plurality of different APIs according to the plan to perform the query; and returning a result for the query based on responses to the requests received from the one or more components of the service.

2. The system of claim 1, wherein the request handler is further configured to determine a cost for performing the query from the plan to perform the query and wherein the requests to the one or more components of the service via the plurality of different APIs according to the plan to perform the query are sent in response to a determination that the cost for performing the query does not exceed a cost threshold.

3. The system of claim 1, wherein to perform the query, the request handler is configured to replace a value of the query with a dynamically determined value.

4. The system of claim 1, wherein the service is an application, build, delivery and development service, wherein the one or more components are tools offered by the application, build, delivery and development service, and wherein the query includes a feature directed to at least one project hosted by the application, build, delivery and development service.

5. A method, comprising:

receiving, via a network endpoint for a service of a provider network, a query specified according to an interface query language at a request handler for the service;

applying, by the request handler, respective interface models to different features of the query to determine respective behavior for invoking programmatic interfaces for one or more components of the service that correspond to the different features of the query based, at least in part, on respective descriptions of interface behaviors in the respective interface models, wherein the respective interface models are specified using respective documents in a data store that controls updates to the respective documents with a change control manager of the service, wherein at least one of the respective interface models includes at least one change to the at least one interface model according to a change to one of the respective documents approved using the change control manager of the service;

according to the respective behavior determined for invoking the programmatic interfaces for the one or more components of the service, generate a plan to perform the query, wherein the plan comprises instructions to invoke selected ones of the programmatic interfaces to perform the different features of the query, wherein the selected ones of the different APIs include an API updated in accordance with the at least one change to the at least one interface model;

invoking, by the request handler, the programmatic interfaces of the one or more components of the service according to the plan to perform the query; and returning a response to the query based on responses received via the programmatic interfaces from the one or more components of the service.

6. The method of claim 5, further comprising:

receiving, via the network endpoint for the service of the provider network, a request directed to one of the programmatic interfaces for one of the one or more components of the service; and sending, by the request handler, the request to the one programmatic interface for the one component of the service.

7. The method of claim 5, further comprising determining an amount of work to perform the query from the plan to perform the query and wherein the one or more programmatic interfaces of the service are invoked in response to determining that the amount of work to perform the query does not exceed a threshold.

8. The method of claim 7, further comprising:

receiving, via the network endpoint for the service of the provider network, a second query specified according to the interface query language at the request handler for the service;

applying, by the request handler, the respective interface models to different features of the second query to determine respective input and output parameters for the programmatic interfaces for the one or more components of the service that correspond to the different features of the query to generate a plan to perform the second query;

determining a cost for performing the second query from the plan to perform the second query; and responsive to determining that the cost for performing the second query exceeds the threshold, denying performance of the second query.

9. The method of claim 5, wherein the service is implemented in a plurality of different regions of the provider network and wherein the network endpoint is a global network endpoint that routes the query to the request handler in one of the different regions that hosts data to be accessed to perform the query.

10. The method of claim 5, wherein performing the query comprises replacing a reference to a value of the query with a dynamically determined value.

11. The method of claim 5, wherein performing the query comprises:
- identifying a trait of the query that adds additional data to an output provided by a first one of the programmatic interfaces to be used as an input to a second one of the programmatic interfaces; and
- dynamically include the additional data as the input to the second one of the programmatic interfaces.

12. The method of claim 5, wherein performing the query comprises:
- identifying a trait of the query that transforms data of an output provided by a first one of the programmatic interfaces to be used as an input to a second one of the programmatic interfaces; and
- transform the data to be used as the input to the second one of the programmatic interfaces.

13. The method of claim 5, further comprising validating, by the request handler, the query before performing the query.

14. One or more non-transitory, computer-readable storage media, storing program instructions that when executed on or across one or more computing devices cause the one or more computing devices to implement:
- receiving, via a network endpoint for a service of a provider network, a query specified according to an interface query language;
- generating a plan to perform the query, wherein in generating the plan to perform the query, the program instructions cause the one or more computing devices to implement:
  - applying respective interface models to different features of the query to determine respective input and output o parameters for programmatic interfaces for one or more components of the service that correspond to the different features of the query based, at least in part, on respective descriptions of interface behaviors in the respective interface models, wherein the respective interface models are specified using respective documents in a data store that controls updates to the respective documents with a change control manager of the service, wherein at least one of the respective interface models includes at least one change to the at least one interface model according to a change to one of the respective documents approved using the change control manager of the service;
  - according to the respective input and output parameters for the programmatic interfaces, generating the plan to perform the query, wherein the plan comprises instructions for the input and output parameters for the programmatic interfaces to perform the one or more features of the query, wherein the selected programmatic interfaces include a programmatic interface updated in accordance with the at least one change to the at least one interface model;
- sending requests to the one or more components of the service via the programmatic interfaces according to the plan to perform the query; and
- returning a response to the query based on responses to the requests received from the one or more components of the service.

15. The one or more non-transitory, computer-readable storage media of claim 14, storing further instructions that when executed on or across the one or more computing devices, cause the one or more computing devices to further implement determining a cost for performing the query from the plan to perform the query and wherein the one or more programmatic interfaces of the service are invoked in response to determining that the cost for performing the query does not exceed a cost threshold.

16. The one or more non-transitory, computer-readable storage media of claim 14, wherein, in performing the query, the program instructions cause the one or more computing devices to implement replacing a value of the query with a dynamically determined value.

17. The one or more non-transitory, computer-readable storage media of claim 14, wherein, in performing the query, the program instructions cause the one or more computing devices to implement:
- identifying a trait of the query that transforms data of an output provided by a first one of the programmatic interfaces to be used as an input to a second one of the programmatic interfaces; and
- transform the data to be used as the input to the second one of the programmatic interfaces.

18. The one or more non-transitory, computer-readable storage media of claim 14, wherein, in performing the query, the program instructions cause the one or more computing devices to implement:
- identifying a trait of the query that adds additional data to an output provided by a first one of the programmatic interfaces to be used as an input to a second one of the programmatic interfaces; and
- dynamically include the additional data as the input to the second one of the programmatic interfaces.

19. The one or more non-transitory, computer-readable storage media of claim 14, storing further instructions that when executed on or across the one or more computing devices, cause the one or more computing devices to further implement determining that the query is authorized before performing the query.

20. The one or more non-transitory, computer-readable storage media of claim 14, wherein the service is an application, build, delivery and development service and wherein the one or more components are tools offered by the application, build, delivery and development service.

* * * * *